United States Patent
Maisel et al.

(10) Patent No.: US 6,265,832 B1
(45) Date of Patent: Jul. 24, 2001

(54) DRIVING CIRCUIT FOR LIGHT-EMITTING DIODES

(75) Inventors: Jürgen Maisel, Mainz; Klaus Beckschwarte, Babenhausen, both of (DE)

(73) Assignee: Mannesmann VDO AG, Frankfurt (DE)

( * ) Notice: Subject to any disclaimer, the term of this patent is extended or adjusted under 35 U.S.C. 154(b) by 0 days.

(21) Appl. No.: 09/363,957

(22) Filed: Jul. 29, 1999

(30) Foreign Application Priority Data

Aug. 6, 1998 (DE) .............................. 198 35 392

(51) Int. Cl.$^7$ .................................................. H05B 37/00
(52) U.S. Cl. ........................................ 315/164; 315/169.3
(58) Field of Search ................................... 315/164, 169.1, 315/169.2, 169.3; 438/30, 612; 373/113, 117, 131, 134; 347/237

(56) References Cited

U.S. PATENT DOCUMENTS

| | | | |
|---|---|---|---|
| 3,666,960 | 5/1972 | Dawson | 307/311 |
| 4,100,552 | 7/1978 | Muto et al. | 346/162 |
| 4,920,283 | * 4/1990 | Elmer et al. | 372/38 |
| 4,963,798 | 10/1990 | McDermott | 315/312 |
| 5,034,757 | * 7/1991 | Godlove | 346/107 R |
| 5,600,157 | * 2/1997 | Abike et al. | 257/84 |
| 6,031,855 | * 2/2000 | Watanabe | 372/38 |

FOREIGN PATENT DOCUMENTS

| | | |
|---|---|---|
| 19602891 | 8/1997 | (DE) . |
| 0377956 | 7/1990 | (EP) . |
| 2265978 | 10/1993 | (GB) . |

* cited by examiner

*Primary Examiner*—Don Wong
*Assistant Examiner*—Trinh Vo Dinh
(74) *Attorney, Agent, or Firm*—Martin A. Farber

(57) ABSTRACT

In a driving circuit for a plurality of light-emitting diodes, in which the current ($I_{LED}$) through each of the light-emitting diodes can be set by a respective current source, and in which a plurality of current sources are combined in an integrated circuit, a plurality of current sources have a common series resistor for reducing the power loss in the individual current sources.

5 Claims, 1 Drawing Sheet

US 6,265,832 B1

DRIVING CIRCUIT FOR LIGHT-EMITTING DIODES

FIELD AND BACKGROUND OF THE INVENTION

The invention relates to a driving circuit for light-emitting diodes which can be used to set the brightness of the light-emitting diodes. Light-emitting diodes are also used for showing information. In this case, either particular items of information are assigned particular light-emitting diodes, or else the displays are divided into a plurality of segments or matrices, each containing one or more light-emitting diodes. In this way, different items of information can be shown on a display according to whether the light-emitting diodes are switched on or off.

To drive the light-emitting diodes, it is known practice to impress the current through the light-emitting diodes using a series resistor connected between the driving voltage and the light-emitting diodes. Nevertheless, different forward voltages $U_{LED}$ of the individual light-emitting diodes (e.g. $U_{LED}$=1.8 V to 2.5 V for red light-emitting diodes) mean different sizes of current through the light-emitting diodes and hence different brightnesses as well.

It is also known practice to drive the light-emitting diodes using a current source. In this way, forward-voltage tolerances of the light-emitting diodes and voltage-supply tolerances now have only a small influence on the brightness of the light-emitting diodes.

Finally, it is known practice to arrange a plurality of current sources in an integrated circuit. To keep the power loss in the integrated circuit to a level which prevents the integrated circuit from being destroyed as a result of thermal overstressing, known driving circuits involve the use of a series resistor for each current source, some of the superfluous voltage dropping across said series resistor and thus preventing the integrated circuits from overheating.

A disadvantage of this is that a relatively large number of series resistors are required for the known driving circuit.

SUMMARY OF THE INVENTION

Hence, the object of the invention is to provide a driving circuit for light-emitting diodes, in which the current through each light-emitting diode can be set by a respective current source, and in which a plurality of current sources are combined in an integrated circuit which requires few series resistors and is thus less expensive.

This object is achieved in that one series resistor is used for a plurality of light-emitting diodes and hence current sources as well. This makes it possible to eliminate a large portion of the unrequited voltage across the series resistor. Since each light-emitting diode is controlled by a separate current source, it is of no consequence for the light intensity of the individual switched-on light-emitting diodes how many of the light-emitting diodes supplied with current via a respective series resistor are presently switched on or off. By reducing the number of series resistors, the space requirement for the driving circuit is also reduced. Thus, with a nominal current through a light-emitting diode of 30 mA, series resistors with a permissible power loss of 250 mW and a supply voltage of 5 V for the driving circuit, three light-emitting diodes can be supplied via one series resistor.

In ordinary integrated circuits, the average possible power loss is indicated as a value at a rated temperature (e.g. 25° C.) with a derating for higher ambient temperatures. This value applies to the whole package. In this case, limits are formed by the package size (number of pins and dimensions) and the design of the so-called frame. This can mean that, for power loss reasons, larger-scale integration, i.e. a higher number of outputs (with appropriate loading), cannot be used or a corresponding number of current sources cannot be integrated.

It is particularly advantageous to make the solder pads for the series resistors on the printed circuit board such that their surface is larger than the surface required for connecting the solder pad and the connection for the series resistor. The cooling effect produced means that the series resistors can then cope with a power loss above their rated power loss.

BRIEF DESCRIPTION OF THE DRAWING

The invention is described in more detail below with reference to the figures of the drawings, in which.

DETAILED DESCRIPTION OF THE PREFERRED EMBODIMENT

Figure 1:
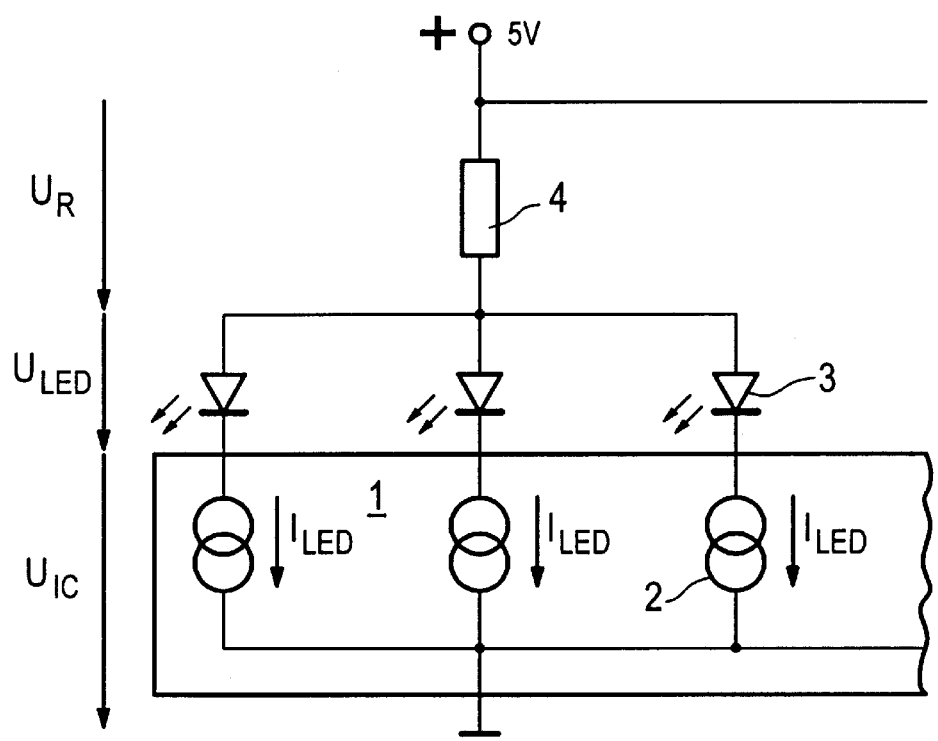
FIG. 1 shows an exemplary embodiment of a circuit diagram of a driving circuit according to the invention.

FIG. 1 shows an integrated circuit 1 containing 3 current sources 2. Each of the current sources 2 is connected to ground potential and to one light-emitting diode 3 in each case. A series resistor 4 is connected firstly to a supply voltage + and secondly to three light-emitting diodes 3. The voltage arrow $U_R$ denotes the voltage drop across the series resistor 4, $U_{LED}$ denotes the voltage drop across a light-emitting diode 3 and $U_{IC}$ denotes the voltage drop across the integrated circuit 1.

The following analysis assumes that each of the current sources 2 sets a constant current $I_{LED}$ of 30 mA, there is a voltage drop $U_{LED}$ of 1.5 V across a conducting light-emitting diode 3, and the series resistor 4 has a value of 24.4Ω. The series resistor 4 has a maximum power loss of 250 mW and the integrated circuit 1 has a power loss also of 250 mW at the highest permissible operating temperature.

If only one current source 2 is switched on and consequently only one light-emitting diode 3 is illuminated, then a current of 30 mA flows through the resistor 4. Hence, there is a voltage drop of $U_R$=30 mA×24.4Ω=0.73 V across the resistor, so that the voltage drop produced across the integrated circuit is $U_{IC}$=5 V–$U_R$–$U_{LED}$=2.77 V. Hence, it follows for the power loss in the integrated circuit 4 that: $P_{IC}$=$U_{IC}$×$I_{LED}$=83 mW. With two light-emitting diodes illuminated, a current of 60 mA flows through the series resistor 4, so that the voltage drop produced is $U_R$=1.46 V. Hence, $U_{IC}$=2.04 V and $P_{IC}$=122 mW.

If all 3 light-emitting diodes 3 are illuminated, then $U_R$=2.2 V, $U_{IC}$=1.3 V and $P_{IC}$=117 mW. An integrated circuit with, for example, a permissible power loss of 250 mW contains 6 current sources, for example. If in each case three of these current sources are equipped with a common series resistor, as illustrated in the present example, then a circuit containing 2 series resistors of 24.4Ω each gives a maximum power loss of 2×122 mW=244 mW, which means that the permissible power loss of the integrated circuit is not exceeded. The resistor 4 is also not overstretched: $P_R$=$U_R$×3 $I_{LED}$=2.2 V×90 mA=198 mW.

Figure 2:
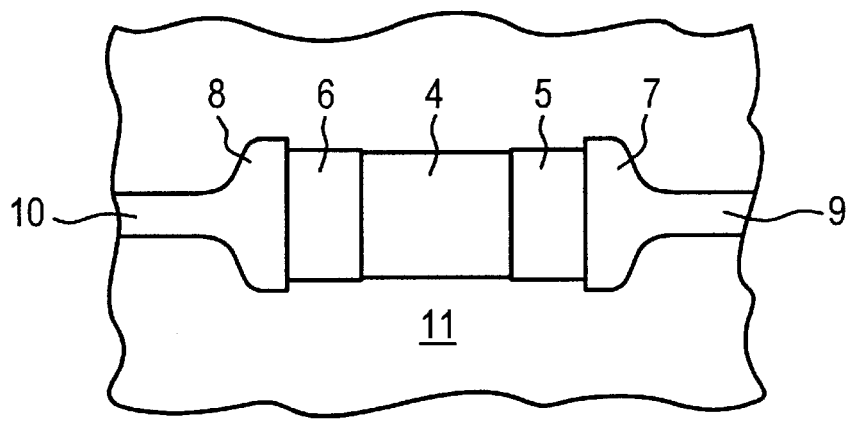
FIG. 2 shows a resistor with a particularly preferred configuration of the solder pads on a printed circuit board.

FIG. 2 shows a series resistor 4 with connections 5,6 soldered to solder pads 7,8. The solder pads 7,8 merge into conductor tracks 9,10 and are arranged on a printed circuit board 11. The solder pads 7,8 are made such that they are larger than would be necessary for the solder connection between the connections 5,6 and the conductor tracks 9,10. The free surface serves as a cooling surface. In this way, the series resistor can be cooled, so that it can dissipate a larger power loss than corresponds to its rated power loss. Thus, with a multiplicity of light-emitting diodes, individual series resistors can be dispensed with under some circumstances because current sources can additionally be supplied via one series resistor.

What is claimed is:

1. A driving circuit for a plurality of light-emitting diodes (3), in which current ($I_{LED}$) through each of the light-emitting diodes (3) is set by a respective current source (2), and in which a plurality of current sources (2) are combined in an integrated circuit (1), wherein individual ones of said plurality of current sources (2) have a common series resistor (4) for reducing power loss in the individual current sources (2); and wherein all currents for individual ones of said plurality of light emitting diodes set by corresponding ones of said individual current sources are conducted through said common series resistor.

2. The driving circuit as claimed in claim 1, wherein one series resistor (4) is provided for 2 light-emitting diodes (3).

3. The driving circuit as claimed in claim 1, wherein one series resistor (4) is provided for 3 light-emitting diodes (3).

4. A driving circuit for a plurality of light-emitting diodes (3), in which current ($I_{LED}$) through each of the light-emitting diodes (3) is set by a respective current source (2), and in which a plurality of current sources (2) are combined in an integrated circuit (1), wherein individual ones of said plurality of current sources (2) have a common series resistor (4) for reducing power loss in the individual current sources (2); and wherein the common series resistor (4) is soldered to solder pads (7,8) by connections (5,6), the solder pads (7,8) being formed as cooling surfaces.

5. The driving circuit as claimed in claim 4, wherein one series resistor (4) is provided for 4 light-emitting diodes.

* * * * *